US005188069A

United States Patent [19]

Fiorenza, II

[11] Patent Number: 5,188,069

[45] Date of Patent: Feb. 23, 1993

[54] SAFETY INTERLOCK FOR A DEVICE

[75] Inventor: John A. Fiorenza, II, Slinger, Wis.

[73] Assignee: Briggs & Stratton, Milwaukee, Wis.

[21] Appl. No.: 791,978

[22] Filed: Nov. 13, 1991

[51] Int. Cl.[5] ........................ B60R 25/04; F02B 77/08

[52] U.S. Cl. ........................ 123/146.50 B; 123/179.23; 123/198 B; 307/10.4

[58] Field of Search .................... 123/146.5 B, 179.23, 123/198 B; 307/10.3, 10.4, 10.5, 10.6; 180/287

[56] References Cited

U.S. PATENT DOCUMENTS

| | | | |
|---|---|---|---|
| 2,843,843 | 7/1958 | Davis | 123/146.5 B |
| 3,726,265 | 4/1973 | Howard | 123/179.23 |
| 3,784,839 | 1/1974 | Weber | 307/10.4 |
| 4,034,732 | 7/1977 | Van Burkleo | 123/198 DC |
| 4,147,151 | 4/1979 | Wright | 123/198 DC |
| 4,180,043 | 12/1979 | Kawamura | 123/146.5 B |
| 4,286,683 | 9/1981 | Zeigner et al. | 180/54.1 |
| 4,369,745 | 1/1983 | Howard | 123/198 DC |
| 4,494,497 | 1/1985 | Uchida et al. | 123/179.4 |
| 4,664,082 | 5/1987 | Suzuki | 123/414 |
| 4,704,598 | 11/1987 | McLeod | 123/196 S |
| 4,796,204 | 1/1989 | Inoue | 123/196 S |
| 4,888,575 | 12/1989 | De Vaulx | 307/10.4 X |
| 4,930,466 | 6/1990 | Osborne, Jr. | 123/179.5 |
| 4,986,228 | 1/1991 | Tharman | 123/179.16 |
| 4,995,357 | 2/1991 | Gonnering et al. | 123/198 DC |

*Primary Examiner*—Tony M. Argenbright

*Attorney, Agent, or Firm*—Andrus, Sceales, Starke & Sawall

[57] ABSTRACT

The safety interlock prevents the starting of a device if one or more safety switches is not first cycled through its operational cycle. Since the safety switches must be operated before starting, the device will not operate if the switches have been tampered with or have failed. The interlock includes a digital memory unit connected to the switch which stores information indicative of the cycling of the switch. The output of the memory unit is interconnected with the starting system of the device such that starting is prevented unless the stored information indicates that each switch has been cycled. In a preferrred embodiment the interlock includes a microprocessor.

29 Claims, 4 Drawing Sheets

SAFETY INTERLOCK FOR A DEVICE

BACKGROUND OF THE INVENTION

This invention relates to human-operated devices such as internal combustion engines. More particularly, this invention relates to a safety interlock that prevents the starting of such a device under certain conditions.

Safety switches are commonly used on many types of human-operated devices, including lawn and garden equipment such as lawnmowers. In a typical device having a safety interlock switch, the device cannot be operated unless the switch is actuated. In lawnmowers, the ignition system is either grounded or otherwise disabled if the safety switches are not in their proper positions.

For example, riding lawnmowers often have several safety switches, including a seat switch, a power take off (PTO) safety switch, and a transmission neutral switch. Before the engine will start, the seat switch must be closed indicating that the operator is sitting on the seat. Also, the PTO switch must be closed indicating that the PTO is disengaged. The transmission must also be in neutral to start the lawnmower, so that safety switch must also be closed.

Unfortunately, it may be possible to tamper with one or more of these safety switches by permanently closing it and thus deactivating it. For example, the seat switch could be taped shut to allow the engine to start even though the operator is not sitting on the seat. In such an event, it is possible for the device to operate even though a potentially hazardous condition exists.

SUMMARY OF THE INVENTION

A safety interlock is disclosed that prevents the starting of a device that has at least one safety switch. The interlock has a determining means for determining whether the switch has been properly operated through at least one open-closed operational cycle before the device may be started. The interlock also has a means for preventing the starting of the device if the determining means determines that the switch has not been properly operated through at least one of its operational cycles. The cycling of the switch by the operator indicates that the switch has not been tampered with or has not failed, so that the device is allowed to start.

Several embodiments of the invention are disclosed using digital memory devices. In a preferred embodiment, both the determining means and the preventing means include a microprocessor that is in circuit connection with each safety switch. The digital memory unit of the microprocessor stores information that indicates whether the switch has been both opened and closed, and whether it is currently in its closed position. Only when such information is received for each switch is the device allowed to operate.

In another embodiment, a flip-flop latch is used for each safety switch to store information that indicates whether the switch has been cycled. The output of the latch is connected to the input of an AND gate. The switch is connected to another input of the AND gate to inform the AND gate whether the switch is currently closed. Only when both the switch is closed and when the latch indicates that the switch had previously been opened is the device allowed to start.

It is a feature and advantage of the present invention to provide a safety interlock that prevents a device from starting if the safety switches are not properly operational.

It is another feature and advantage of the present invention to provide a tamperproof safety interlock system.

These and other features of the present invention will be apparent to those skilled in the art from the following description of the preferred embodiments and the attached drawings, in which:

DETAILED DESCRIPTION OF THE PREFERRED EMBODIMENTS

Figure 1:
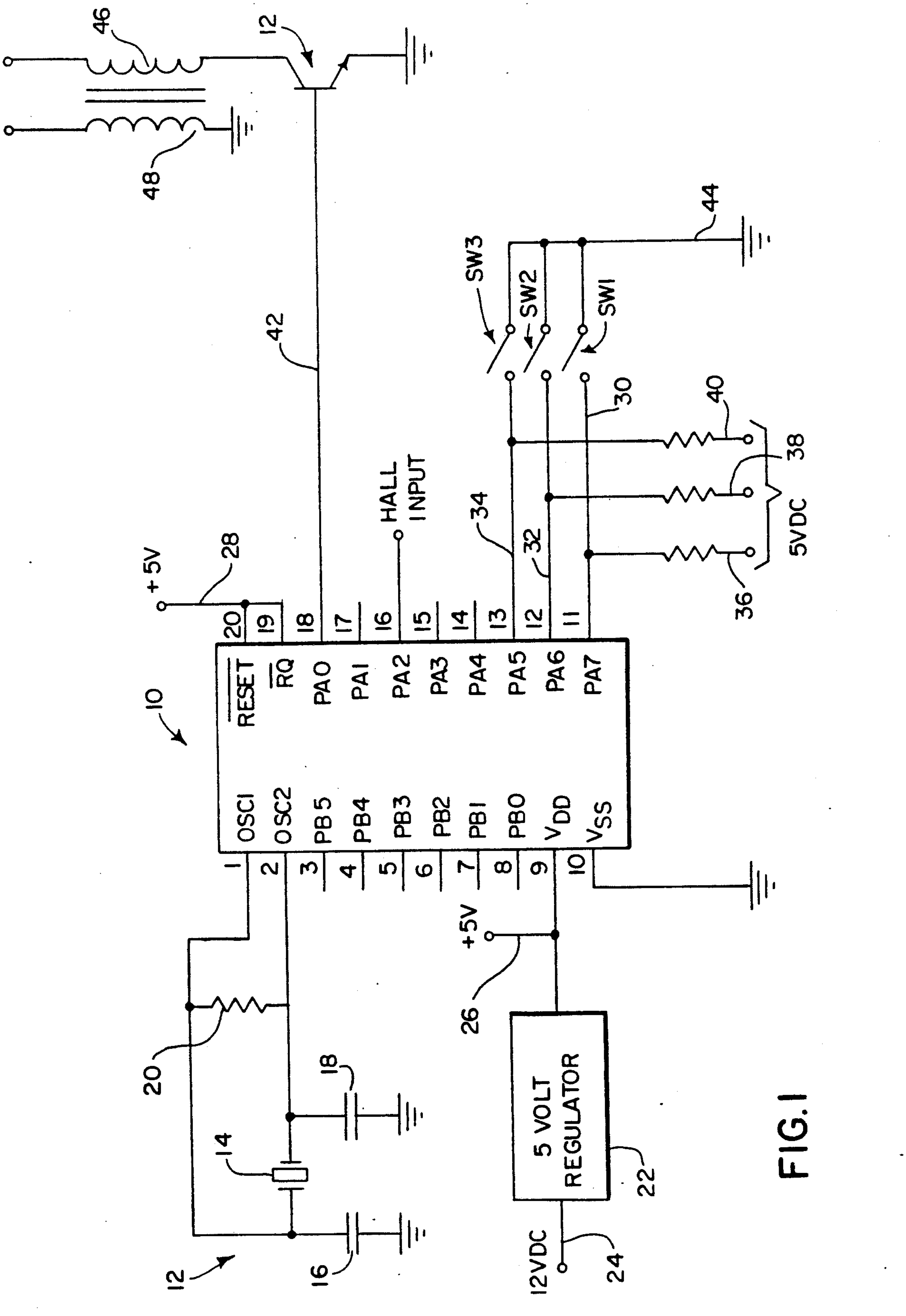
FIG. 1 is a schematic diagram of the preferred embodiment of the present invention incorporating a microprocessor.

FIG. 1 is a schematic diagram of the preferred embodiment of the safety interlock according to the present invention. In FIG. 1, microprocessor 10 is used as part of the determining means to determine whether safety switches SW1, SW2, and SW3 have been successfully operated before the engine is allowed to start. Microprocessor 10 also is used to prevent the operation of the engine (not shown) by controlling a Darlington transistor 12. Microprocessor 10 is preferably a model MC68HCO05J1 microprocessor available from Motorola, although other processors may be used.

An oscillator circuit 12 is connected to pins 1 and 2 of microprocessor 10 to provide the necessary clock signals to the microprocessor. Circuit 12 includes an oscillating crystal 14 which oscillates between two positions in response to the charging and discharging cycles of capacitor 16 and capacitor 18. A resistor 20 is connected to both of the capacitors.

A 12 VDC power source such as a battery (not shown) supplies 12 volts of unregulated power to a 5 volt regulator 22 via line 24. The regulated 5 VDC output of regulator 22 is input to pin 9 of microprocessor 10 and is used to power the microprocessor. Also, the regulated 5 VDC is output at line 26 which may be connected, for example, to line 28 and thus provide the proper voltage level to reset pin 20 which allows the microprocessor to operate. If the reset pin was grounded, the microprocessor would constantly be reset and would not operate.

A signal from a Hall sensor (not shown) is input at pin 16 of microprocessor 10. The sensor signal is used to determine the speed of the engine, as is well known in the art.

Safety switches SW1, SW2, and SW3 are connected to pins 11, 12 and 13 respectively of microprocessor 10 via lines 30, 32 and 34 respectively. Each of lines 30, 32 and 34 is connected to a 5 VDC power source via resistors 36, 38 and 40 respectively.

The output of microprocessor 10, at pin 18, is connected to the base of Darlington transistor 12 via line 42. All remaining, unused pins of microprocessor 10 are grounded.

The circuit depicted in FIG. 1 operates in the following manner. When switches SW1, SW2, and SW3 are open, pins 11, 12, and 13 are held in their high state of +5 VDC because there is very little current flow through resistors 36, 38 and 40. Switches SW1, SW2, and SW3 are normally open; they must be closed for the engine to run.

Switch SW1 may, for example, be a seat switch. Switch SW2 may be a switch whose closure indicates that the power take off (PTO) is disengaged. The closure of switch SW3 may indicate that the transmission is in neutral.

If the operator sits on the seat of the riding lawnmower, switch SW1 is closed. The closure of switch SW1, like the closure of switches SW2 and SW3, causes the input at its respective pin of the microprocessor to go low, since the switches are connected to ground 44. As discussed in connection with FIG. 2, the fact that a switch has been closed is stored in memory of the microprocessor. The operator must then open the switch. The fact that the switch has been opened is also stored in the microprocessor memory. The switch must thereafter be closed since it must be in the closed position for the engine to run.

By requiring the switches to be both opened and closed before the device will start, the present invention prevents the switches from being permanently closed or opened due to tampering or switch failure.

Assuming that all of the safety switches have been opened and closed and are currently in their closed position, a high signal is output at pin 18 on line 42 to turn on Darlington transistor 12. The turning on of transistor 12 allows current to flow through primary winding 46 of the ignition system. The subsequent turning off of transistor 12 causes the flux field of winding 46 to collapse, generating a high voltage signal in secondary winding 48 to fire a spark plug (not shown) connected across the secondary winding.

Figure 2:
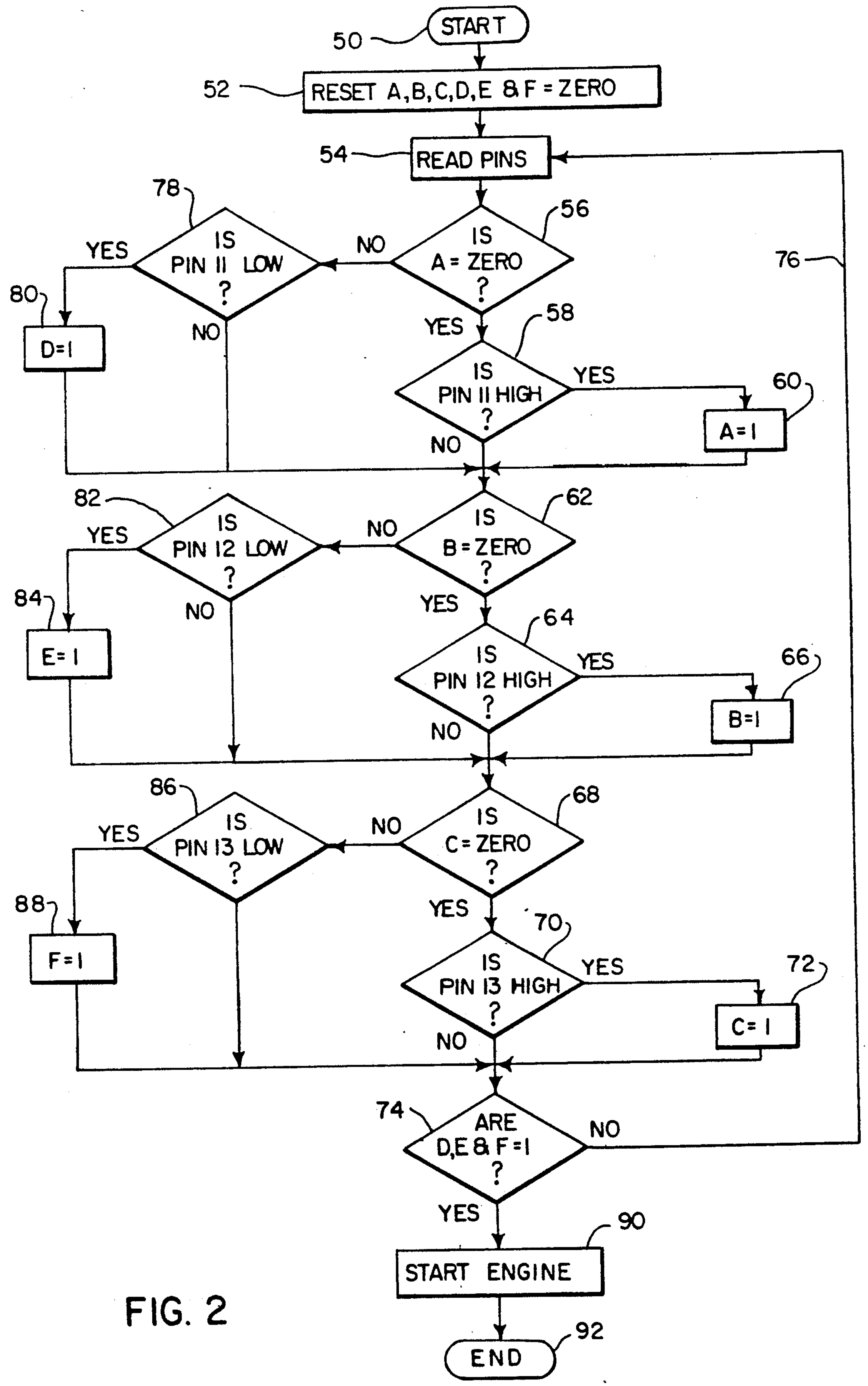
FIG. 2 is a flow chart of the software used to operate the microprocessor of FIG. 1.

FIG. 2 is a flow chart of the software used to program microprocessor 10 of FIG. 1. The purpose of the software is to determine whether each of the safety switches has been exercised through an open-closed cycle and to determine that the switches are currently closed, so that the ignition system is allowed to start in the usual manner.

In FIG. 2, after the software starts running as indicated by step 50, memory locations A, B, C, D, E, and F are reset to zero at step 52. Memory locations A through C store information indicating whether switches SW1, SW2, and SW3 respectively have been opened. Memory locations D through F store information indicating whether switches SW1–SW3, respectively, have been closed.

At step 54, pins 11 through 13 are read. A determination is then made at step 56 whether memory location A is equal to zero. Since all of the memory locations were reset to zero at step 52, location A will be zero the first time the software runs. A determination is then made at step 58 whether the signal at pin 11 is high. If pin 11 is high, this indicates that switch SW1 is open. Memory location A is set to 1 at step 60 to indicate that switch SW1 has been opened.

A determination is then made at step 62 whether memory location B is equal to zero. Since B = 0 the first time that the software is run, a determination is then made at step 64 whether pin 12 is high, indicating that switch SW2 is open. If the answer is "Yes" at step 64, memory location B is set to 1 at step 66 to record that switch SW2 has been opened.

A determination is then made at step 68 whether memory location C is equal to zero. Since C equals zero the first time the software is run, the software proceeds to step 70. At step 70, a determination is made whether pin 13 is high, indicating that switch SW3 is currently open. If switch SW3 is open, memory location C is set to 1 at step 72 and the software proceeds to step 74.

At step 74, a determination is made whether memory locations D, E and F are all equal to 1. During the first running of the software, these memory locations are equal to zero, so the software returns to step 54 via line 76.

Since A is now equal to 1, the decision "Is A = 0?" at step 56 yields a "No" answer, and step 78 becomes the next step. At step 78, a determination is made whether pin 11 is now low. Pin 11 in its low state indicates that switch SW1 is now closed. If the answer is "Yes" at step 78, a 1 is placed in memory location D at step 80, and step 62 becomes the next step. If pin 11 is not low, this indicates that switch SW1 is currently open, and the routine proceeds to step 62.

If B ≠ 0 at step 62, a determination is made at step 82 whether pin 12 is low. If pin 12 is low, this indicates that switch SW2 is currently closed, and a value of 1 is stored in memory location E at step 84. The routine then proceeds to step 68.

A determination is made at step 68 whether memory location C is equal to zero. If C ≠ 0, this indicates that switch SW3 has been opened at some point. The routine then proceeds to step 86 where it determines whether pin 13 is low. If pin 13 is low, switch SW3 is currently closed, and a value of 1 is stored in memory location F at step 88. The routine then proceeds to step 74.

A determination is then made at step 74 whether memory locations D, E, and F are all equal to 1. If these locations are all equal to 1, then the engine is allowed to start at step 90 as long as switches SW1, SW2, and SW3 are currently in their closed positions.

If locations D, E, and F are equal to 1, this indicates that their respective switches have been closed. Since these locations cannot all be equal to 1 unless memory locations A, B, and C are also equal to 1, there is no need at step 74 to also determine whether locations A, B, and C are equal to 1. In other words, a "Yes" response at step 74 indicates that all the memory locations are equal to 1. This event may only occur when each of switches SW1, SW2, and SW3 has been both opened and closed. The routine then ends at step 92.

Figure 3:
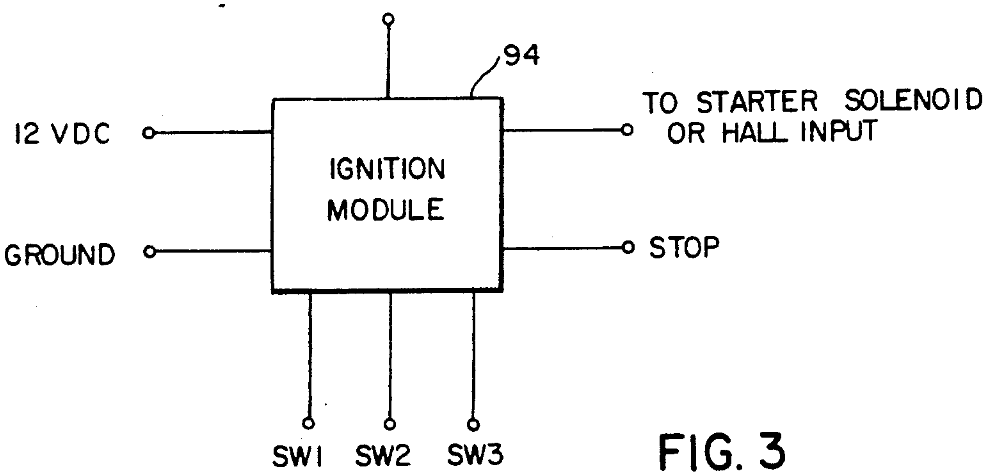
FIG. 3 is a block diagram depicting an ignition module incorporating the present invention.

FIG. 3 is a block diagram depicting an ignition module 94 which contains the safety interlock according to the present invention as well as the ignition system. Since both the interlock components and the ignition system are placed into a single unitary, enclosed module, the operator cannot disable the interlock by disconnecting it from the ignition system.

Figure 4B:
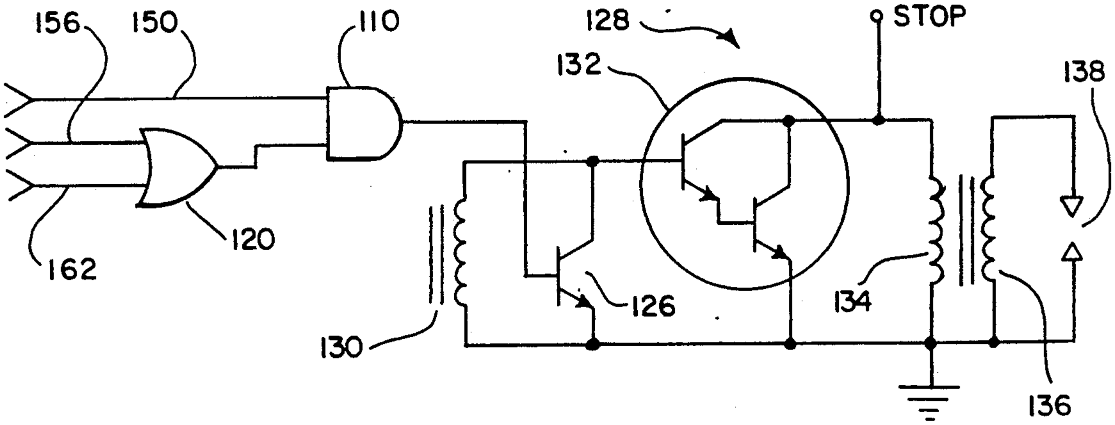
FIGS. 4A and 4B are schematic diagrams of an alternate embodiment of the invention in which latches and logic gates are used.
Figure 4A:
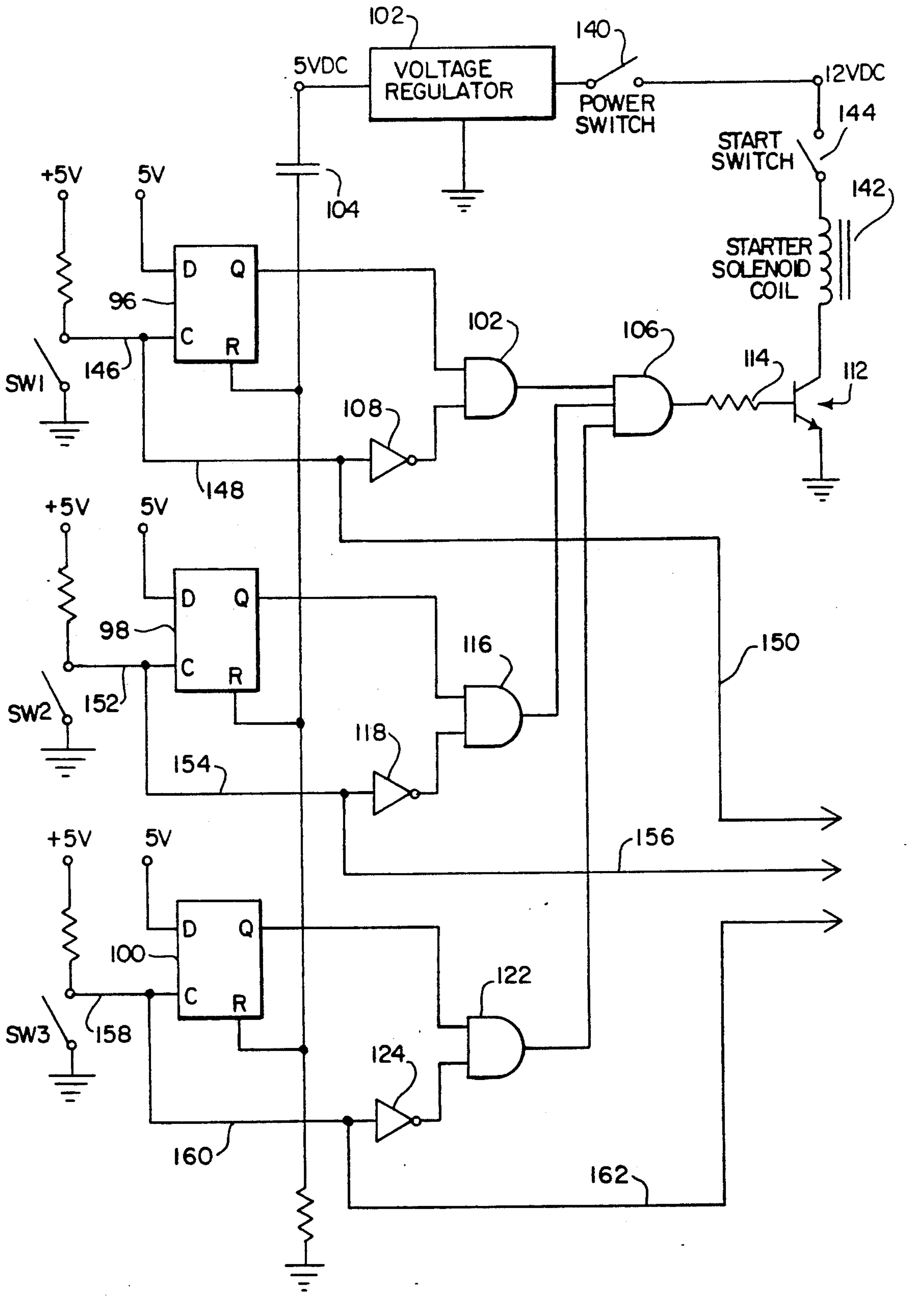

FIGS. 4A and 4B depict a second embodiment of the present invention in which flip-flops and logic gates are used.

In FIG. 4A, each of the switches SW1, SW2, and SW3 is connected to the clock signal input C of its respective flip-flop 96, 98, and 100. Each of the data inputs D is connected to a 5 VDC power source. Each of the reset inputs R of the flip-flops is connected to a 5 volt voltage regulator 102 through a capacitor 104.

The output at pin Q of each of the flip-flops is input to an AND gate. Each of the safety switches is connected to the other input of the AND gate through an inverter. Specifically, the Q output of flip-flop 96 is connected to a two-input AND gate 102, whose output in turn is connected to a three-input AND gate 106. The other input to AND gate 102 is connected to switch SW1 through an inverter 108. The signal from switch SW1 is also connected to an input of a two-input AND gate 110 (FIG. 4B). The output of AND gate 106 is connected to a Darlington transistor 112 (FIG. 4A) through a resistor 114.

Similarly, the Q output of flip-flop 98 is connected to the input of a two-input AND gate 116. The other input to AND gate 116 is the signal from switch SW2 that has been inverted by inverter 118. The uninverted signal from switch SW2 is also input to an OR gate 120 (FIG. 4B). The output from AND gate 116 is connected to the input of AND gate 106.

Regarding switch SW3, its associated flip-flop 100 has its Q output connected as an input to an AND gate 122. The other input to AND gate 122 is the signal from switch SW3 after it has been inverted by inverter 124. The signal from switch SW3 is also connected as an input to OR gate 120 (FIG. 4B). The output from AND gate 122 is connected as an input to the three-input AND gate 106. The output from OR gate 120 is connected to the input of AND gate 110. The output from AND gate 110 is connected to transistor 126 in an ignition circuit 128.

The ignition circuit 128 also includes a trigger coil 130, a Darlington transistor 132, a primary winding 134, a secondary winding 136, and a spark plug 138 connected across the secondary winding.

The embodiment depicted in FIGS. 4A and 4B operates as follows. When the device is turned on, power switch 140 is closed. The closing of switch 140 applies 12 VDC at the input of voltage regulator 102. The output of regulator 102 is 5 VDC of regulated power. When power switch 140 is first closed, each of the reset pins of flip-flops 96, 98 and 100 goes high to a +5 volt since there is no charge across capacitor 104. The reset pins going high causes the flip-flops to go to a known state, and their respective Q outputs all go low. The low Q outputs place low signals to the inputs of AND gates 102, 116 and 122, causing those AND gates to output low signals to AND gate 106. The output of AND gate 106 is thus also low, which prevents starter solenoid coil 142 from being energized to start the engine even if start switch 144 is closed.

When switch SW1 is open, the clock input C of flip-flop 96 is high at a +5 volts. The Q output will stay low since the flip-flop is clocked only when input C senses a high-going transition. When switch SW1 is closed, the voltage at input C is low but the flip-flop is not clocked. When switch SW1 is closed and then opened, the flip-flop is clocked since a high-going transition has been sensed at input C. The Q output of flip-flop 96 then goes high, resulting in a high input to AND gate 102. If the switch is thereafter closed, this low signal is inverted by inverter 108 and input to AND gate 102. The AND gate thus receives two positive inputs when switch SW1 has gone from a closed to an open state, and when the switch is currently closed. Since both of these conditions is necessary to allow the engine to start, AND gate 102 will only output a high state signal to AND gate 106 when these conditions have been met.

The flip-flops and AND gates interconnected with switches SW2 and SW3 operate in a similar manner. Specifically, when switch SW2 is closed and then opened, flip-flop 98 is clocked, and its high state Q output is input to AND gate 116. If switch SW2 is thereafter closed, its low state signal is inverted by inverter 118 and the inverted signal (which is now in the high state) is input to AND gate 116. AND gate 116 then outputs a high state signal to AND gate 106.

Similarly, when switch SW3 is closed and then opened, flip-flop 100 is clocked so that its Q output goes to the high state. This high state signal is then input to AND gate 122. If switch SW3 is thereafter closed, its low state signal is inverted by inverter 124 and the resulting high state signal is input to AND gate 122. The high state output of AND gate 122 is input to AND gate 106.

If all of the switches have been opened and closed and are currently closed, AND gage 106 outputs a high-state signal to transistor 112. Transistor 112 is turned on by the high state signal, allowing starter solenoid coil 142 to energize; this allows the engine to start.

Once the engine is running, the system according to the second embodiment provides a means for stopping the engine if certain conditions are met. The engine is stopped if switch SW1 is open, and either switch SW2 or switch SW3 is open. Assuming that switch SW1 is a seat switch, that SW2 indicates whether the PTO is engaged, and that SW3 indicates whether the transmission is in neutral, then the engine will stop running if the operator leaves his seat while the PTO is engaged or the transmission is not in neutral.

In FIGS. 4A and 4B, the stopping of the engine under these conditions is accomplished as follows. If switch SW1 is open, a +5 volt signal is input to AND gate 110 via lines 146, 148, and 150. If switch SW2 is open, a +5 VDC signal is input to OR gate 120 via lines 152, 154, and 156. If switch SW3 is open, a +5 volt signal is input to OR gate 120 via lines 158, 160, and 162.

If either of switches SW2 or SW3 is open, OR gate 120 outputs a high state signal to AND gate 110. If switch SW1 is also open, AND gate 110 receives a high state signal via line 150. In that event AND gate 110 outputs a high state signal which turns on transistor 126 to short trigger coil 130. The shorting of the trigger coil keeps transistor 132 off, thereby preventing the ignition system from firing spark plug 138. The device will thus stop operating until AND gate 110 outputs a low state signal.

While several embodiments of the present invention have been shown and described, alternate embodiments will be apparent to those skilled in the art and are within the intended scope of the present invention. Therefore, the invention is limited only by the following claims.

I claim:

1. An interlock that prevents the starting of a device, said device having at least one switch, comprising:
   - determining means for determining whether said switch has been properly operated through at least one operational cycle of said switch before said device is started, said operational cycle including the opening and the closing of said switch; and
   - means for preventing the starting of said device if said determining means determines that said switch has not been properly operated through said at least one cycle.

2. The interlock of claim 1, wherein said device is an internal combustion engine.

3. The interlock of claim 1, wherein said determining means determines whether said switch has been successively closed and then opened to determine whether said switch has been operated through said cycle.

4. The interlock of claim 1, wherein said determining means includes a microprocessor that is in circuit connection with switch.

5. The interlock of claim 1, wherein said determining means includes:

a digital memory unit having an input in circuit connection with said switch and having an output in circuit connection with said preventing means, said memory unit storing information indicating whether said switch has been both opened and closed.

6. The interlock of claim 1, wherein said preventing means includes a microprocessor.

7. The interlock of claim 1, wherein said at least one switch includes two switches;

wherein said determining means determines whether both of said switches have been properly operated through at least one operational cycle of each switch; and wherein said preventing means prevents the starting of the device if said determining means determines that either of said switches has not been successfully operated through its respective cycle.

8. The interlock of claim 1, wherein said determining means further comprises:

means for determining whether said switch is in its actuated position.

9. The interlock of claim 8, wherein said determining means includes:

a logic gate having first and second inputs and an output, said first logic gate input being in circuit connection with said switch; and a digital memory unit having an input in circuit connection with said switch and having an output in circuit connection with said second logic gate input.

10. The interlock of claim 9, wherein said logic gate is an AND gate and wherein said digital memory unit is a flip-flop.

11. The interlock of claim 9, wherein said preventing means includes input means for receiving the output from said logic gate.

12. An interlock for an engine, said engine having at least one switch, comprising:

determining means for determining whether said switch has been successfully actuated and deactuated before said engine is started; and means for preventing the starting of said engine if said determining means determines that said switch has not been successfully actuated and deactuated.

13. The interlock of claim 12, wherein said determining means determines whether said switch has been closed and then opened.

14. The interlock of claim 12, wherein said determining means determines whether said switch has been opened and then closed.

15. The interlock of claim 12, wherein said determining means includes a microprocessor that is in circuit connection with said switch.

16. The interlock of claim 12, wherein said determining means includes a flip-flop having an input in circuit connection with said switch and having an output in circuit connection with said preventing means.

17. The interlock of claim 12, wherein said preventing means includes a microprocessor.

18. The interlock of claim 12, wherein said engine has an ignition system that includes an ignition primary winding that generates ignition pulses, and wherein said preventing means prevents said primary winding from achieving a sufficiently high voltage to start said engine.

19. The interlock of claim 18, further comprising:

a unitary module that encloses said determining means, said preventing means, and said ignition system.

20. The interlock of claim 12, wherein said determining means further comprises:

means for determining whether said switch is in its actuated position.

21. The interlock of claim 20, wherein said determining means includes:

a logic gate having first and second inputs and an output, said first logic gate input being in circuit connection with said switch; and a digital memory unit having an input in circuit connection with said switch and having an output in circuit connection with said second logic gate input.

22. The interlock of claim 21, wherein said logic gate is an AND gate and wherein said digital memory unit is a flip-flop.

23. The interlock of claim 20, wherein said preventing means includes input means for receiving the output from said logic gate.

24. The interlock of claim 12, wherein said at least one switch includes two switches;

wherein said determining means determines whether both of said switches have been successfully actuated and deactuated before said engine is started; and wherein said preventing means prevents the starting of the engine if said determining means determines that either of said switches has not been properly actuated and deactuated.

25. The interlock of claim 12, wherein said switch is a safety switch.

26. The interlock of claim 12, further comprising:

means for stopping said engine after it has been started if said switch is deactuated.

27. The interlock of claim 12, wherein said engine is installed in a device having a seat for a human operator of said device, and wherein said switch is a seat switch that is actuated when said operator sits on said seat.

28. The interlock of claim 12, wherein said engine also has an engageable power take off shaft, and wherein said switch indicates whether said power take off shaft is engaged.

29. The interlock of claim 12, wherein said engine is installed in a device having a transmission that is shiftable to a disengaged position, and wherein said switch indicates whether said transmission is in said disengaged position.

* * * * *

UNITED STATES PATENT AND TRADEMARK OFFICE

CERTIFICATE OF CORRECTION

PATENT NO. : 5,188,069

DATED : February 23, 1993

INVENTOR(S) : Fiorenza, II

It is certified that error appears in the above-identified patent and that said Letters Patent is hereby corrected as shown below:

CLAIM 4, Col. 7, Line 3, after "with" insert ----said----.

Signed and Sealed this

Eighteenth Day of January, 1994

*Attest:*

Bruce Lehman

BRUCE LEHMAN

*Attesting Officer* *Commissioner of Patents and Trademarks*